(12) United States Patent
McGill et al.

(10) Patent No.: US 11,634,123 B2
(45) Date of Patent: Apr. 25, 2023

(54) METHODS AND SYSTEMS FOR PRIORITIZING COMPUTING METHODS FOR AUTONOMOUS VEHICLES

(71) Applicant: Toyota Research Institute, Inc., Los Altos, CA (US)

(72) Inventors: Stephen G. McGill, Broomall, PA (US); Nicholas Charles Fishwick, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 370 days.

(21) Appl. No.: 16/924,500

(22) Filed: Jul. 9, 2020

(65) Prior Publication Data
US 2022/0009483 A1 Jan. 13, 2022

(51) Int. Cl.
| | |
|---|---|
| *B60W 30/095* | (2012.01) |
| *G06N 5/04* | (2023.01) |
| *G06F 9/50* | (2006.01) |
| *G06F 9/48* | (2006.01) |
| *B60W 60/00* | (2020.01) |

(52) U.S. Cl.
CPC ...... *B60W 30/095* (2013.01); *B60W 60/0017* (2020.02); *B60W 60/0025* (2020.02); *G06F 9/4881* (2013.01); *G06F 9/5038* (2013.01); *G06N 5/04* (2013.01); *B60W 2554/402* (2020.02); *B60W 2554/80* (2020.02)

(58) Field of Classification Search
CPC ........... B60W 30/095; B60W 60/0017; B60W 60/0025; B60W 2554/402; B60W 2554/80; G06F 9/4881; G06F 9/5038; G06F 9/5027; G06F 2209/5019; G06N 5/04

See application file for complete search history.

(56) References Cited

U.S. PATENT DOCUMENTS

| | | | |
|---|---|---|---|
| 7,844,398 B2 | 11/2010 | Sato et al. | |
| 7,901,873 B2 | 3/2011 | Nicholson et al. | |
| 8,738,486 B2 | 5/2014 | McGeehan | |
| 9,481,367 B1 * | 11/2016 | Gordon | B60W 10/20 |
| 10,235,882 B1 * | 3/2019 | Aoude | G08G 1/163 |
| 10,496,091 B1 * | 12/2019 | Ross | G06N 5/04 |
| 11,132,897 B2 * | 9/2021 | McErlean | H04L 12/40 |
| 11,249,790 B1 * | 2/2022 | Gupta | G06F 9/5077 |

(Continued)

FOREIGN PATENT DOCUMENTS

| | | |
|---|---|---|
| WO | 2018134831 A1 | 7/2018 |
| WO | 2018188877 A1 | 10/2018 |
| WO | 2019125026 A1 | 6/2019 |

*Primary Examiner* — Peter D Nolan
*Assistant Examiner* — Ashley L Redhead, Jr.
(74) *Attorney, Agent, or Firm* — Dinsmore & Shohl LLP (57) ABSTRACT

A method includes receiving sensor data associated with one or more inputs associated with a road portion, determining a level of risk associated with each of the one or more inputs, determining an estimated amount of computing resources that each of a plurality of candidate computing methods will consume, and selecting one or more computing methods from the plurality of candidate computing methods to associate with the one or more inputs based on the levels of risk associated with the one or more inputs and the estimated amount of computing resources that the candidate computing methods will consume.

13 Claims, 4 Drawing Sheets

(56) References Cited

U.S. PATENT DOCUMENTS

| | | | |
|---|---|---|---|
| 2014/0114556 A1* | 4/2014 | Pan | G08G 1/00 |
| | | | 701/119 |
| 2014/0372167 A1* | 12/2014 | Hillier | G06Q 10/06315 |
| | | | 705/7.24 |
| 2015/0064659 A1 | 3/2015 | Dubens | |
| 2017/0046192 A1* | 2/2017 | Sivasubramanian | |
| | | | G06F 9/5083 |
| 2020/0104174 A1* | 4/2020 | Vlcek | G06F 9/5011 |
| 2020/0159215 A1* | 5/2020 | Ding | G05D 1/0221 |
| 2020/0327803 A1* | 10/2020 | Hobohm | G08G 1/096775 |
| 2021/0019179 A1* | 1/2021 | Yadav | G06F 9/5038 |
| 2021/0020038 A1* | 1/2021 | Weldemariam | G08G 1/0133 |
| 2021/0182108 A1* | 6/2021 | Eberlein | G06F 9/4881 |
| 2021/0182701 A1* | 6/2021 | Jeyachandran | G06N 20/00 |
| 2021/0256846 A1* | 8/2021 | McErlean | G07C 5/02 |
| 2022/0009483 A1* | 1/2022 | McGill | G06F 9/4881 |

\* cited by examiner

METHODS AND SYSTEMS FOR PRIORITIZING COMPUTING METHODS FOR AUTONOMOUS VEHICLES

TECHNICAL FIELD

The present specification relates to predicting road agent behavior, and more particularly, to methods and systems for prioritizing computing methods for autonomous vehicles.

BACKGROUND

Autonomous vehicles must navigate a variety of driving environments. In particular, autonomous vehicles must be aware of other vehicles on the road and must adjust their driving behavior based on those other vehicles. If an autonomous vehicle is able to make predictions about the behavior of other road agents, the autonomous vehicle may be able to better adjust its driving behavior accordingly. As such, autonomous vehicles may utilize various algorithms to predict the behavior of other road agents.

Different prediction algorithms or other computing methods may utilize different amounts of computing resources and may predict the behavior of road agents with different levels of accuracy. Because vehicles have limited computing resources, they may not be able to utilize the most accurate prediction algorithms at all times. Accordingly, a need exists for methods and systems for prioritizing computing methods for autonomous vehicles.

SUMMARY

In one embodiment, a method may include receiving sensor data associated with one or more inputs associated with a road portion, determining a level of risk associated with each of the one or more inputs, determining an estimated amount of computing resources that each of a plurality of candidate computing methods will consume, and selecting one or more computing methods from the plurality of candidate computing methods to associate with the one or more inputs based on the level of risk associated with each of the one or more inputs and the estimated amount of computing resources that the plurality of candidate computing methods will consume.

In another embodiment, a vehicle system for an autonomous vehicle may include one or more processors, one or more memory modules, one or more vehicle sensors, and machine readable instructions stored in the one or more memory modules. When executed by the one or more processors, the machine readable instructions may cause the vehicle system to receive, with the one or more vehicle sensors, sensor data associated with one or more inputs associated with a road portion, determine a level of risk associated with each of the one or more inputs, determine an estimated amount of computing resources that each of a plurality of candidate computing methods will consume, and select one or more computing methods from the plurality of candidate computing methods to associate with the one or more inputs based on the level of risk associated with each of the one or more inputs and the estimated amount of computing resources that the plurality of candidate computing methods will consume.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for prioritizing computing methods for autonomous vehicles. An autonomous vehicle may rely on a number of computing methods to perform autonomous driving. Some of these computing methods may comprise localization, object detection, and predicting behavior of other road agents. The autonomous vehicle may adjust its driving behavior based on the outputs of these various computing methods.

Each of the various computing methods run by the autonomous vehicle may utilize a certain amount of computing resources (e.g., wattage, CPU cycles, memory). Thus, because the autonomous vehicle has a finite amount of available computing resources, there is a limit to the number of computing methods that can be run simultaneously by the autonomous vehicle. As such, in order to optimize the performance of the autonomous vehicle, the vehicle may prioritize certain computing methods. That is, the autonomous vehicle may select certain computing methods that require fewer computing resources over other computing methods that require more computing resources at certain times.

Alternatively, the autonomous vehicle may schedule a plurality of computing methods to be run in a particular sequence. The computing methods may be prioritized based on the quality of a computing method (e.g., the prediction accuracy of a road agent prediction algorithm) and the amount of computing resources that the computing method requires, as disclosed herein. In one example, computing methods may be prioritized to minimize the use of computing resources while ensuring a minimum level of performance. In another example, computing methods may be prioritized to maximize performance while ensuring that the amount of computing resources used remains below a certain level.

Figure 1:
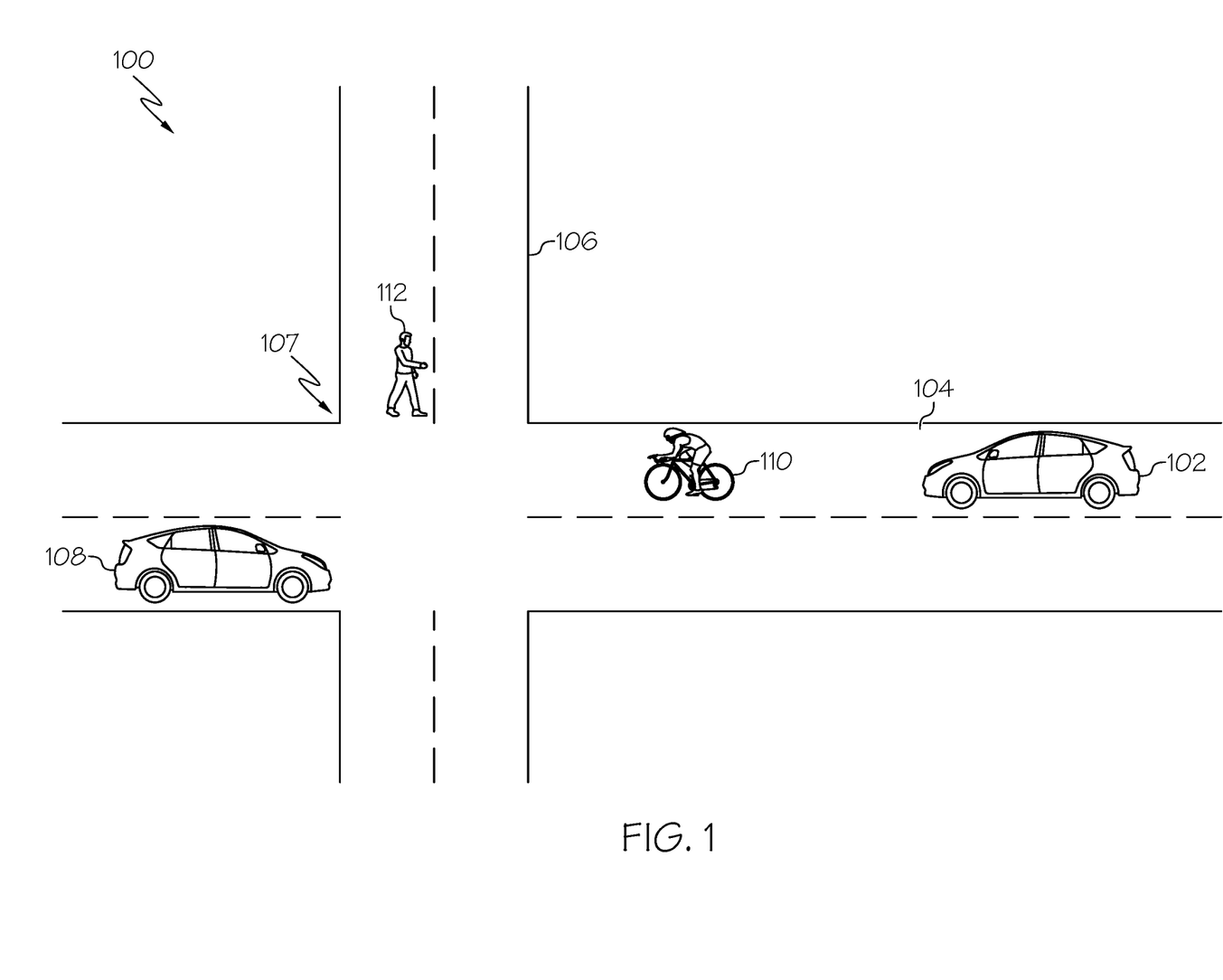
FIG. 1 schematically depicts a system for prioritizing computing methods for autonomous vehicles, according to one or more embodiments shown and described herein.

Turning now to the figures, FIG. 1 schematically depicts an exemplary road portion 100 for prioritizing computing methods for autonomous vehicles. The road portion 100 includes a vehicle 102 driving along a road 104. In the illustrated example, the vehicle 102 is an autonomous vehicle driven by computer control. In other examples, the vehicle 102 may be a non-autonomous vehicle driven by a human driver. In the example of FIG. 1, the road portion 100 comprises roads 104 and 106 and an intersection 107 where the roads 104, 106 intersect.

In the example of FIG. 1, the vehicle 102 drives along the road 104 approaching the intersection 107. Another vehicle 108 approaches the intersection 107 from the other side of the road 104, a bicyclist 110 is riding in front of the vehicle 102 on the road 106 and a pedestrian 112 is present on the road 106. The vehicle 108, the bicyclist 110, and the pedestrian 112 are all road agents whose activity the autonomous vehicle 102 may account for while performing self-driving. Furthermore, it may be desirable for the autonomous vehicle 102 to predict the movements of the vehicle 108, the bicyclist 110, and the pedestrian 112 when planning and performing driving maneuvers. Accordingly, the autonomous vehicle 102 may run any number of computing methods (e.g., prediction algorithms) to predict the movements of the vehicle 108, the bicyclist 110, and/or the pedestrian 112. In addition to running various prediction algorithms, the autonomous vehicle 102 may also run any other number of computing methods (e.g., localization algorithms, object detection algorithms) in order to facilitate autonomous driving. Accordingly, in order to efficiently use the limited computing resources of the autonomous vehicle 102, computing methods may be prioritized using the techniques described herein.

Figure 2:
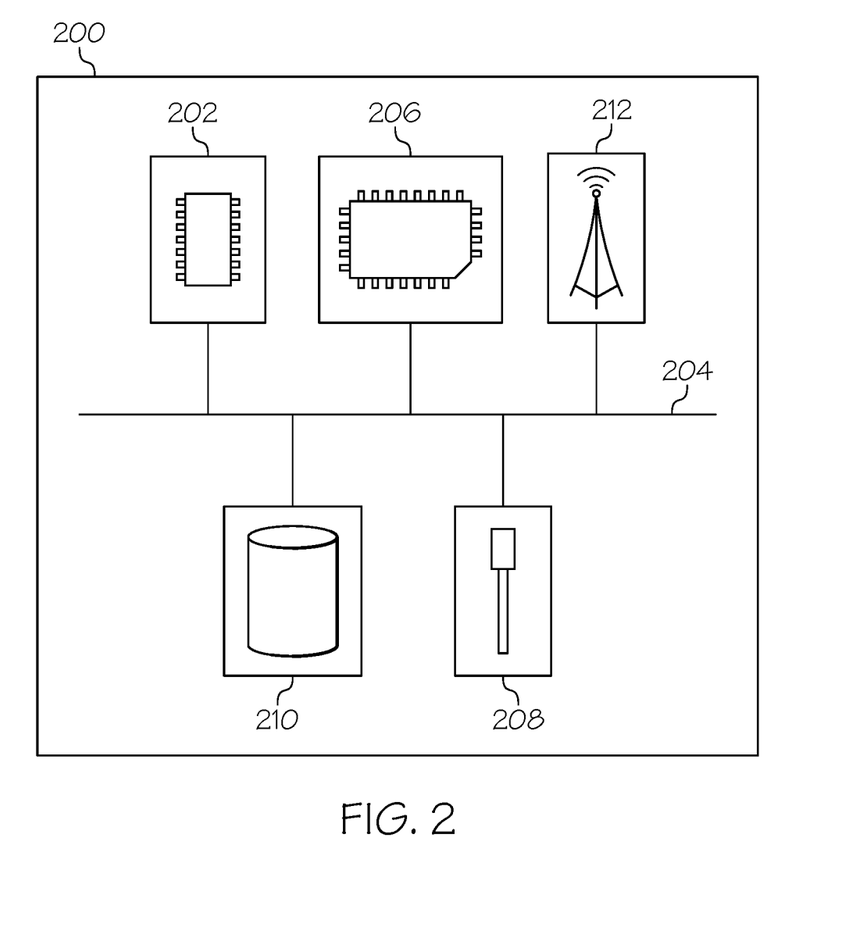
FIG. 2 depicts a schematic diagram of a vehicle system, according to one or more embodiments shown and described herein.

FIG. 2 depicts a vehicle system 200 included in the autonomous vehicle 102 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the vehicle 102. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 are described in more detail below with reference to FIG. 3.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Based on the location, the vehicle system 200 may determine a type of the road on which the vehicle is currently traveling. For example, the vehicle system 200 may match the location of the vehicle with a map that including information about roads and determines the type of the road.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. The sensors 210 may monitor the surroundings of the vehicle 102 and the data gathered by the sensors may be used by an autonomous driving module to autonomously navigate the vehicle 102.

Still referring to FIG. 2, the vehicle system 200 comprises network interface hardware 212. The network interface hardware 212 may communicatively couple the vehicle system 200 to remote computing devices or servers, as described in further detail below. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

Figure 3:
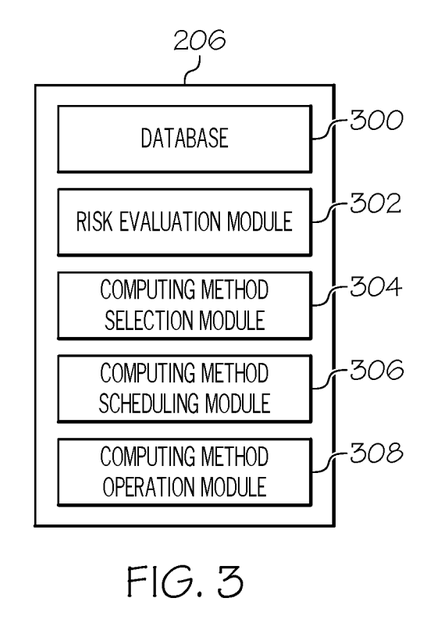
FIG. 3 depicts a schematic diagram of memory modules of a vehicle system, according to one or more embodiments shown and described herein.

Now referring to FIG. 3, the one or more memory modules 206 of the vehicle system 200 are shown. As shown in FIG. 3, the one or more memory modules 206 include a database 300, a risk evaluation module 302, a computing method selection module 304, a computing method scheduling module 306, and a computing method operation module 308. Each of the database 300, the risk evaluation module 302, the computing method selection module 304, the computing method scheduling module 306, and the computing method operation module 308 may be a program module in the form of operating systems, application program modules, and other program modules stored in one or more memory modules 206. In some embodiments, the program module may be stored in a remote storage device that may communicate with the vehicle system 200. Such a program module may include, but is not limited to, routines, subroutines, programs, objects, components, data structures and the like for performing specific tasks or executing specific data types as will be described below.

The database 300 may store data received by the vehicle system 200 (e.g., data received by the vehicle sensors 210). The database 300 may also store a plurality of computing methods (e.g., road agent prediction algorithms) that the vehicle system 200 may utilize to perform autonomous driving. Each of the computing methods stored in the database 300 may have a certain accuracy or confidence. In addition, each of the computing methods stored in the database 300 may require a certain amount of computing resources to operate. As such, the database 300 may store an indication of the accuracy or confidence of the computing methods and an estimate of the amount of computing resources needed to be consumed to operate the computing methods. The accuracy and resource consumption of the various computing methods may be utilized by the other memory modules 206 as discussed below.

The risk evaluation module 302 may perform an initial risk evaluation associated with a plurality of inputs to the vehicle sensors 210. In one example, the inputs may be associated with other road agents (e.g., the vehicle 108, bicyclist 110, or pedestrian 112 of FIG. 1). In other examples, the inputs may be associated with a particular area (e.g., a section of the road 104 of FIG. 1). In other examples, the inputs may be associated with a particular geometry (e.g., the intersection 107 of FIG. 1). In other examples, the inputs may be associated with any combination of road agents, road areas, and road geometries.

In examples where inputs to the vehicle sensors 210 are associated with other road agents, the inputs may comprise sensor data indicating the presence of another road agent. For example, inputs to the vehicle sensors 210 may be used by an object detection algorithm of the vehicle system 200 to identify the presence of another road agent (e.g., another vehicle on the road). The risk evaluation module 302 may then perform an initial risk evaluation of the identified road agent.

In examples where inputs to the vehicle sensors 210 are associated with a particular area, the inputs may comprise sensor data received from a particular area of a road with respect to the vehicle 102. For example, the inputs may comprise sensor data received from the right side of the vehicle 102. As such, the risk evaluation module 302 may perform an initial risk evaluation associated with the road area.

In examples where inputs to the vehicle sensors 210 are associated with a particular geometry, the inputs may comprise sensor data associated with a crosswalk or other features of a road. In particular, the inputs may comprise sensor data associated with contours of road geometries. The risk evaluation module 302 may then perform an initial risk evaluation of the identified road contours or geometries. For example, with respect to a crosswalk, the risk evaluation module 302 may determine areas of risk for different portions of a crosswalk. That is, the risk evaluation module 302 may determine whether risk is coming from the middle of a crosswalk (e.g., pedestrians in the middle of crossing a street) or from the edges of a crosswalk (e.g., pedestrians on a sidewalk about to begin to cross a street).

In the illustrated example, the risk evaluation module 302 may perform an evaluation of the risk that the vehicle 102 will be involved in a collision with a road agent based on the inputs to the vehicle sensors 210. In other examples, other metrics of risk may be used by the risk evaluation module 302. A variety of factors may be used by the risk evaluation module 302 to determine an initial risk assessment. For example, a densely occupied area of a roadway in proximity to the vehicle 102 may be considered high risk. In another example, an area with slow moving traffic and one or more gaps (indicating the possibility of a lane change by other vehicles) may be considered high risk.

The risk evaluation module 302 may also determine a level of risk based in part on the planned trajectory of the vehicle 102. For example, if the vehicle 102 is planning to make an upcoming right turn, the risk evaluation module 302 may determine that road agents on the right side of the vehicle are higher risk than road agents on the left side of the vehicle. In another example, a road agent positioned within the planned trajectory of the vehicle 102 may be considered higher risk than a road agent positioned elsewhere.

After the risk evaluation module 302 performs an initial risk evaluation associated with the plurality of inputs to the vehicle sensors 210, the computing method selection module 304 may determine a compute plan by selecting one or more computing methods to be assigned to one or more of the inputs. The computing method selection module 304 may select computing methods from a plurality of candidate computing methods. The candidate computing methods may be computing methods that perform a desired task. For example, if the behavior of a vehicle is to be predicted, the candidate computing methods may comprise a plurality of vehicle prediction algorithms. The computing method selection module 304 may then determine a compute plan by selecting computing methods from the candidate computing methods as described herein.

The computing method selection module 304 may assign computing methods to the inputs based on the risk of each input, as determined by the risk evaluation module 302, and the expected computing resources needed by the computing methods. For example, if the inputs represent a plurality of road agents, the computing method selection module 304 may assign a road agent prediction algorithm to each of the road agents. While road agent prediction algorithms are one type of computing method that may be selected by the computing method selection module 304, it should be understood that in other examples, other types of computing methods may be selected by the computing method selection module 304.

Different prediction algorithms may be assigned to each road agent based on the risk associated with each road agent. Specifically, road agents to which the risk evaluation module 302 has assigned a higher risk may be assigned more accurate prediction algorithms that utilize more computing resources, while road agents to which the risk evaluation module 302 has assigned a lower risk may be assigned less accurate prediction algorithms that utilize less computing resources. Accordingly, the vehicle system 200 may make more accurate predictions about road agents that pose a greater risk to the vehicle 102. For road agents that pose less of a risk to the vehicle 102, it may not be necessary to predict their behavior with such a high degree of accuracy. Accordingly, prediction algorithms that use less computing resources may be used. This may allow the vehicle system 200 to use less computing resources overall. This may thereby increasing fuel efficiency of the vehicle 102, increase the life span of components, reduce the operating temperature of the vehicle system 200, as well as providing other benefits.

In some examples, the type of prediction algorithm assigned to different inputs may depend on the type of road agents identified. For example, if a particular area of a road is determined to only contain pedestrians and no vehicles, the computing method selection module 304 may only select pedestrian prediction algorithms, as running vehicle prediction algorithms on this portion of the road would be unnecessary. Similarly, if a particular area of a road has only vehicles and no pedestrians, the computing method selection module 304 may only select vehicle prediction algorithms, as running pedestrian prediction algorithms on this portion of the road would be unnecessary.

In one example, the computing method selection module 304 may generate a compute plan so as to maximize the amount of computing resources consumed. That is, the computing method selection module 304 may select computing methods for each of the inputs such that the computing methods utilize the maximum amount of computing resources while ensuring that at least one computing method is assigned to each input and ensuring that the total amount of computing resources utilized by all of the computing methods does not exceed the capacity of the vehicle system 200. Because computing methods that utilize more computing resources are generally more accurate than those that utilize less computing resources, this approach is likely to assign computing methods in a way that maximizes the overall accuracy of the computing methods.

In another example, the computing method selection module 304 may generate a compute plan so as to minimize the amount of computing resources consumed. That is, the computing method selection module 304 may select computing methods for each of the inputs such that the computing methods utilize the minimum amount of computing resources while ensuring that at least one computing method is assigned to each input. Under this approach, the vehicle system may minimize its computing resources usage, which may have a variety of benefits including improving fuel efficiency of the vehicle 102, increasing the life span of components of the vehicle system 200, and the like.

In other examples, other approaches may be utilized to strike a balance between the accuracy of the various computing methods selected by the computing method selection module 304 and the amount of computing resources that those computing methods consume. In some examples, certain constraints may be given regarding an accuracy of computing methods and resource consumption of those computing methods. For example, a constraint may comprise a maximum amount of computing resources to be consumed and a minimum required accuracy of computing methods to be selected. In these examples, the computing method selection module 304 may utilize dynamic programming to select computing methods for each of the inputs while ensuring that the constraints are satisfied.

In addition to assigning different inputs to different computing methods, it may also be desirable to schedule different computing methods to run at different times. This may allow multiple computing methods that utilize significant computing resources to be run sequentially, whereas it would not be possible to run all the computing methods simultaneously without exceeding the computing resource capacity of the vehicle system 200. This is discussed in further detail below in connection with the computing method scheduling module 306.

Referring still to FIG. 3, the computing method scheduling module 306 may schedule different computing methods to be run at different times. A variety of metrics may be utilized to schedule the various computing methods. In one example, different computing methods may be scheduled based on when those computing methods will be actionable. For example, a situation may arise where there are two road agents in the vicinity of the vehicle 102 in which one of the road agents is significantly closer to the vehicle 102 than the other. In may be desirable to run prediction algorithms with respect to each of these two road agents and make driving decisions based on the outputs of the prediction algorithms. However, because one of the road agents is closer than the other, it may be desirable to predict the actions of the closer road agent first since that prediction will be actionable in a shorter time frame than the prediction of the behavior of the other road agent. Accordingly, the computing method scheduling module 306 may schedule a first prediction algorithm to be run with respect to the closer road agent and may schedule a second prediction algorithm to be run with respect to the other road agent after the first algorithm is completed. As such, by the time the second prediction algorithm is run, the first prediction algorithm will be completed and the computing resources devoted to the first prediction algorithm will be available to the second prediction algorithm.

In another example, different computing methods may take longer to run than other computing methods. In particular, computing methods that are more reliable generally take longer to run than computing methods that are less reliable. Thus, the computing method scheduling module 306 may schedule different algorithms for different inputs based on the risk levels for the inputs determined by the risk evaluation module 302 and based on the amount of time that the computing methods are expected to take to run. In some examples, the computing method scheduling module 306 may use dynamic programming to schedule a plurality of computing methods to be run while satisfying one or more constraints (e.g., minimum levels of accuracy, maximum amount of computing resources used, maximum amount of time to complete, etc.).

In one example, one computing method may rely on the output of another computing method. In these examples, the computing method scheduling module 306 may take this into account when scheduling computing methods. For example, an object perception computing method may rely on the output of a localization computing method. Thus, it may be desirable to schedule the localization computing method to complete prior to the object perception computing method.

In other examples, computing methods related to higher risk areas may be scheduled before computing methods related to lower risk areas. For example, if the vehicle 102 is planning to make a right turn at an upcoming intersection where there is a pedestrian near the intersection to the right as well as oncoming traffic on the other side of the intersection, it may be desirable to run a pedestrian prediction algorithm with respect to the pedestrian and a vehicle prediction algorithm with respect to the oncoming traffic. However, because the vehicle is planning to turn right, the computing method scheduling module 306 may schedule the pedestrian prediction module before the vehicle prediction algorithm because the pedestrian poses a greater risk given the planned trajectory of the vehicle 102. Alternatively, if the vehicle 102 were approaching that same intersection and planning to turn left, the computing method scheduling module 306 may instead schedule the vehicle prediction algorithm before the pedestrian prediction module because, in this instance, the oncoming traffic would pose the greater risk.

In some examples, the vehicle system 200 may receive data from other vehicles via vehicle-to-vehicle (V2V) communication. The computing method selection module 304 and the computing method scheduling module 306 may utilize this V2V communication in assigning and predicting computing methods. For example, if the vehicle 102 is approaching an intersection and there are other vehicles obstructing the view of the intersection, the vehicle 102 may not be able to determine whether there are any pedestrians at the upcoming intersection. As such, it may be desirable for the vehicle system 200 to run a pedestrian prediction algorithm. However, if another vehicle closer to the intersection and with a better view of the intersection is able to discern that there are no pedestrians at the intersection, that vehicle may communicate the lack of pedestrians to the vehicle 102 using V2V communication. As such, the vehicle 102 may thereby not need to run any pedestrian prediction algorithms. As such, the computing method selection module 304 and/or the computing method scheduling module 306 may select and/or assign other computing methods that utilize more computing resources, since no computing resources will need to be saved for pedestrian prediction algorithms.

In another example, the vehicle system 200 may communicate with external servers or computing devices to receive real-time data that may be utilized by the computing method selection module 304 and/or the computing method scheduling module 306 when selecting and/or assigning computing methods. For example, an external server may transmit a signal to the vehicle 102 indicating that the vehicle 102 is nearing a sports stadium where a game has recently completed, and thus, there are likely to be more pedestrians in the area. As such, the computing method selection module 304 and/or the computing method scheduling module 306 may reserve certain computing resources to run pedestrian prediction modules.

After the computing method selection module 304 selects one or more computing methods and/or the computing method scheduling module 306 schedules one or more computing methods, the computing method operation module 308 may run the selected and/or scheduled computing methods. If the computing method scheduling module 306 has scheduled a plurality of computing methods, the computing method operation module 308 may run the computing methods as scheduled by the computing method scheduling module 306. After the computing method operation module 308 runs the computing methods, the vehicle system 200 may adjust the driving behavior of the vehicle 102 based on the outputs of the computing methods run by the computing method operation module 308.

In some examples, the risk evaluation module 302 may perform certain operations that produce intermediate outputs that may be used by certain computing methods. In these examples, the intermediate outputs of the risk evaluation module 302 may be stored in the database 300. Then, when the computing method operation module 308 runs the selected computing methods, the computing method operation module 308 may use the stored intermediate outputs to run the computing methods. This may reduce the computing resources and/or time needed to run the computing methods.

Figure 4:
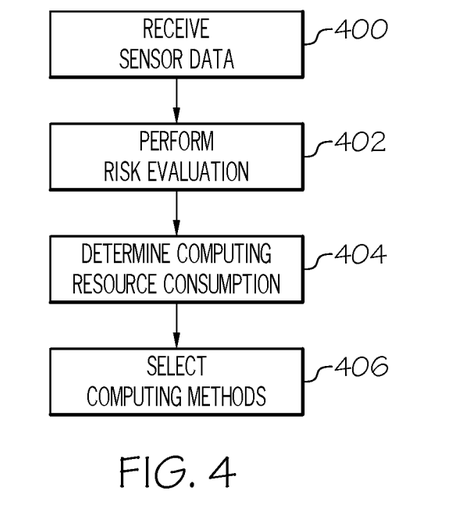
FIG. 4 depicts a flow chart of an exemplary method for prioritizing computing methods for autonomous vehicles, according to one or more embodiments shown and described herein.

FIG. 4 depicts a flowchart of a method for prioritizing computing methods for an autonomous vehicle, according to one or more embodiments shown and described herein. At step 400, the vehicle sensors 210 receive sensor data associated with one or more inputs associated with a road portion. In one example, at least one or the one or more inputs is associated with a road agent. In another example, at least one of the one or more inputs is associated with an area of the road portion. In another example, at least one of the one or more inputs is associated with a geometry of the road portion.

At step 402, the risk evaluation module 302 determines a level of risk associated with each of the one or more inputs. In one example, the level of risk associated with at least one of the one or more inputs is based at least in part on a distance between the autonomous vehicle 102 and a road agent. In another example, the level of risk associated with at least one of the one or more inputs is based at least in part on a trajectory of the autonomous vehicle 102.

At step 404, the computing method selection module 304 determines an estimated amount of computing resources that each of a plurality of candidate computing methods will consume. The candidate computing methods may be associated with a desired function based on the inputs (e.g., a vehicle predication algorithm for a vehicle or a pedestrian prediction algorithm for a pedestrian). The computing method selection module 304 may also receive one or more constraints. In one example, the constraints may be based on an a desired accuracy of computing methods to be used. In another example, the constraints may be based on an amount of computing resources to be consumed by computing methods.

At step 406, the computing method selection module 304 selects one or more computing methods from the plurality of candidate computing methods to associate with the one or more inputs based on the level of risk associated with each of the one or more inputs and the estimated amount of computing resources that the plurality of candidate computing methods will consume. In one example, at least one of the one or more computing methods comprises a road agent prediction algorithm. In another example, at least one of the one or more computing methods comprises a localization algorithm. In another example, at least one of the one or more computing methods comprises an object detection algorithm. In another example, the computing method selection module 304 may select the one or more computing methods based at least in part on one or more constraints.

Figure 5:
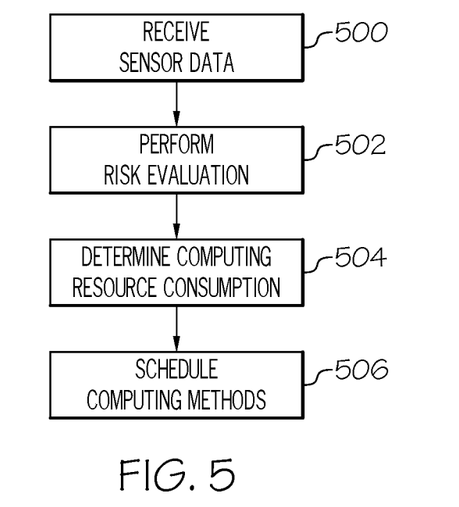
FIG. 5 depicts a flow chart of another exemplary method for prioritizing computing methods for autonomous vehicles, according to one or more embodiments shown and described herein.

FIG. 5 depicts a flowchart of another method for prioritizing computing methods for an autonomous vehicle, according to one or more embodiments shown and described herein. At step 500, the vehicle sensors 210 receive sensor data associated with one or more inputs associated with a road portion. At step 502, the risk evaluation module 302 determines a level of risk associated with each of the one or more inputs. At step 504, the computing method selection module 304 determines an estimated amount of computing resources that each of a plurality of candidate computing methods will consume.

At step 506, the computing method scheduling module 306 schedules operation of one or more computing methods from the plurality of candidate computing methods. In one example, the computing method scheduling module 306 receives one or more constraints associated with the one or more computing methods and uses dynamic programming to schedule operation of the one or more computing methods to satisfy the constraints. In another example, the one or more computing methods are actionable at one or more times and the computing method scheduling module 306 schedules the operation of the one or more computing methods based on the one or more times at which the one or more computing methods are actionable.

It should be understood that embodiments described herein are directed to systems and methods for prioritizing computing methods for autonomous vehicles. Vehicle sensors of an autonomous vehicle may receive sensor data associated with a plurality of inputs. An initial risk evaluation may be performed to determine a level of risk associated with each of the inputs. A plurality of candidate computing methods may be available to be run based on the inputs. Each of the candidate computing methods may consume a different amount of computing resources. A compute plan may be determined that performs a different computing method with each of the inputs. The compute plan may be based on the risk associated with each of the inputs and the computing resources estimated to be consumed by each of the candidate computing methods. The different candidate methods may also be scheduled to be performed at different times. Constraints regarding accuracy of computing methods and computing resource usage may be received and dynamic programming may be used to schedule the computing methods.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving, by a vehicle system of an autonomous vehicle, first sensor data associated with a first area of a road;
receiving, by the vehicle system of the autonomous vehicle, second sensor data associated with a second area of the road;
determining a first level of risk associated with the first area of the road based on the first sensor data;
determining a second level of risk associated with the second area of the road based on the second sensor data;
selecting a first computing method to predict road agent behavior in one of the first area of the road and the second area of the road having a higher risk level, and selecting a second computing method to predict road agent behavior in the other of the first area of the road and the second area of the road having a lower risk level, the first computing method having a higher prediction accuracy than the second computing method;
executing the first computing method and the second computing method to predict road agent behavior in the first area of the road and the second area of the road; and
adjusting driving behavior of the autonomous vehicle based on a first output of the first computing method and a second output of the second computing method.

2. The method of claim 1, wherein at least one of the first computing method or the second computing method comprises a localization algorithm.

3. The method of claim 1, wherein at least one of the first computing method or the second computing method comprises an object detection algorithm.

4. The method of claim 1, wherein the first level of risk associated with the first area of the road or the second level of risk associated with the second area of the road is based at least in part on a distance between the autonomous vehicle and a road agent.

5. The method of claim 1, wherein the first level of risk associated with the first area of the road or the second level of risk associated with the second area of the road is based at least in part on a trajectory of the autonomous vehicle.

6. The method of claim 1, further comprising:
scheduling operation of the first computing method and the second computing method.

7. The method of claim 6, further comprising:
receiving one or more constraints associated with the first computing method and the second computing method; and
using dynamic programming to schedule operation of the first computing method and the second computing method.

8. The method of claim 6, wherein the first computing method and the second computing method are actionable at one or more times, the method further comprising:
scheduling the operation of the first computing method and the second computing method based on the one or more times at which the first computing method and the second computing method are actionable.

9. A vehicle system for an autonomous vehicle comprising:
one or more processors;
one or more memory modules
one or more vehicle sensors; and machine readable instructions stored in the one or more memory modules that, when executed by the one or more processors, cause the vehicle system to:
- receive, with the one or more vehicle sensors, first sensor data associated with a first area of with a road;
- receive, with the one or more vehicle sensors, second sensor data associated with a second area of the road;
- determine a first level of risk associated with the first area of the road based on the first sensor data;
- determine a second level of risk associated with the second area of the road based on the second sensor data;
- select a first computing method to predict road agent behavior in one of the first area of the road and the second area of the road having a higher risk level, and selecting a second computing method to predict road agent behavior in the other of the first area of the road and the second area of the road having a lower risk level, the first computing method having a higher prediction accuracy than the second computing method;
- execute the first computing method and the second computing method to predict road agent behavior in the first area of the road and the second area of the road; and
- adjust driving behavior of the autonomous vehicle based on a first output of the first computing method and a second output of the second computing method.

10. The vehicle system of claim 9, wherein the level of risk associated with the first area of the road or the second level of risk associated with the second area of the road is based at least in part on a distance between the autonomous vehicle and a road agent.

11. The vehicle system of claim 9, wherein the first level of risk associated with the first area of the road or the second level of risk associated with the second area of the road is based at least in part on a trajectory of the autonomous vehicle.

12. The vehicle system of claim 9, wherein the machine readable instructions, when executed by the one or more processors, further cause the vehicle system to schedule operation of the first computing method and the second computing method.

13. The vehicle system of claim 9, wherein the machine readable instructions, when executed by the one or more processors, further cause the vehicle system to:
- receive one or more constraints associated with the first computing method and the second computing method; and
- use dynamic programming to schedule the operation of the first computing method and the second computing method.

* * * * *